(12) United States Patent
Sartor et al.

(10) Patent No.: US 6,892,429 B2
(45) Date of Patent: May 17, 2005

(54) BRAKE DEVICE FOR A LACE

(75) Inventors: Paolo Sartor, Montebeluna (IT); Gabriele Frare, Venegazzu (IT)

(73) Assignee: Lange International S.A., Fribourg (CH)

( * ) Notice: Subject to any disclaimer, the term of this patent is extended or adjusted under 35 U.S.C. 154(b) by 0 days.

(21) Appl. No.: 10/601,609

(22) Filed: Jun. 23, 2003

(65) Prior Publication Data

US 2004/0000036 A1 Jan. 1, 2004

(30) Foreign Application Priority Data

Jun. 26, 2002 (CH) .............................. 1117/02

(51) Int. Cl.$^7$ ............................................. A43C 7/00
(52) U.S. Cl. .................. 24/712.6; 24/712.5; 24/134 L; 24/132 R
(58) Field of Search ............................. 24/712, 712.2, 24/712.4, 712.5, 712.6, 712.7, 132 R, 134 L; 36/50.1

(56) References Cited

U.S. PATENT DOCUMENTS

| | | | | |
|---|---|---|---|---|
| 1,242,774 A | | 10/1917 | Curry | |
| 1,481,903 A | * | 1/1924 | Hart | 24/712.6 |
| 1,696,790 A | * | 12/1928 | Bongiovanni | 24/712.6 |
| 1,703,689 A | * | 2/1929 | Okrainetz et al. | 24/712.2 |
| 2,200,895 A | * | 5/1940 | Rio | 24/712.5 |
| 2,470,316 A | * | 5/1949 | Miller | 24/134 L |
| 4,465,011 A | | 8/1984 | Merry | |
| 5,136,794 A | | 8/1992 | Stampacchia et al. | |
| 5,361,461 A | | 11/1994 | Anscher | |
| 6,327,750 B1 | * | 12/2001 | Muldowney et al. | 24/712.2 |
| 6,339,867 B1 | | 1/2002 | Azam | |

FOREIGN PATENT DOCUMENTS

| | | |
|---|---|---|
| EP | 1 066 767 | 1/2001 |
| WO | WO 9603186 | 2/1996 |

* cited by examiner

*Primary Examiner*—Robert J. Sandy
(74) *Attorney, Agent, or Firm*—Bugnion S.A.; John Moetteli

(57) ABSTRACT

The brake device (30) for a lace (2), of a boot (31), sliding in a base part (1) linked to the boot (31), comprises a lever (3) articulated on the base part (1), returned by an elastic means (11) into a position of contact with the lace (2) preventing the sliding of the lace (2) in one direction by pressing action. The lever (3) has holding means (15, 16) enabling it to maintain a second, stable position allowing the sliding of the lace (2) in both directions, thus making the action required for opening the boot more convenient.

13 Claims, 3 Drawing Sheets

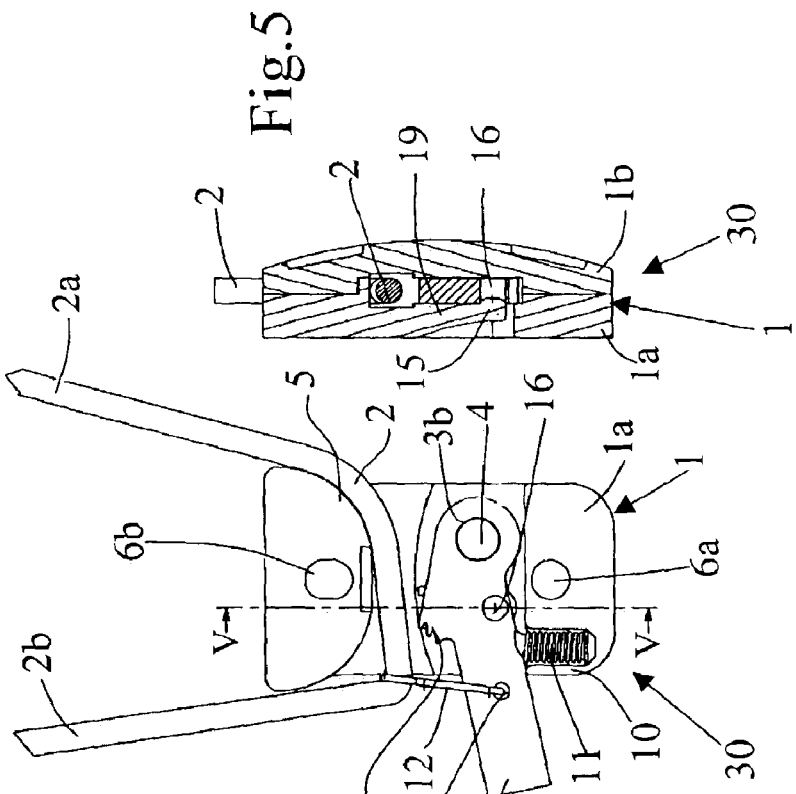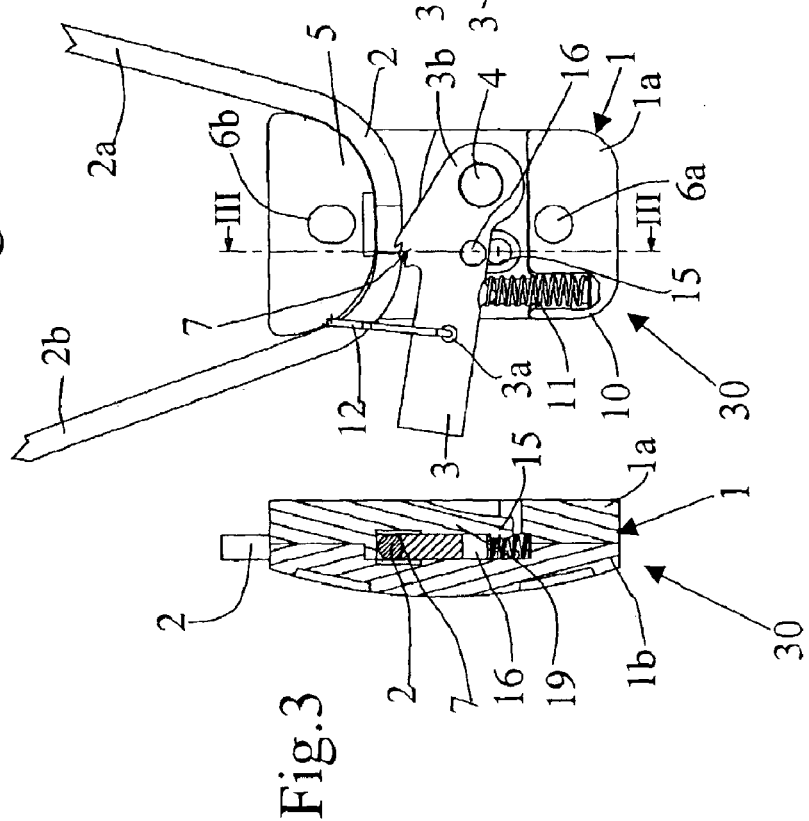

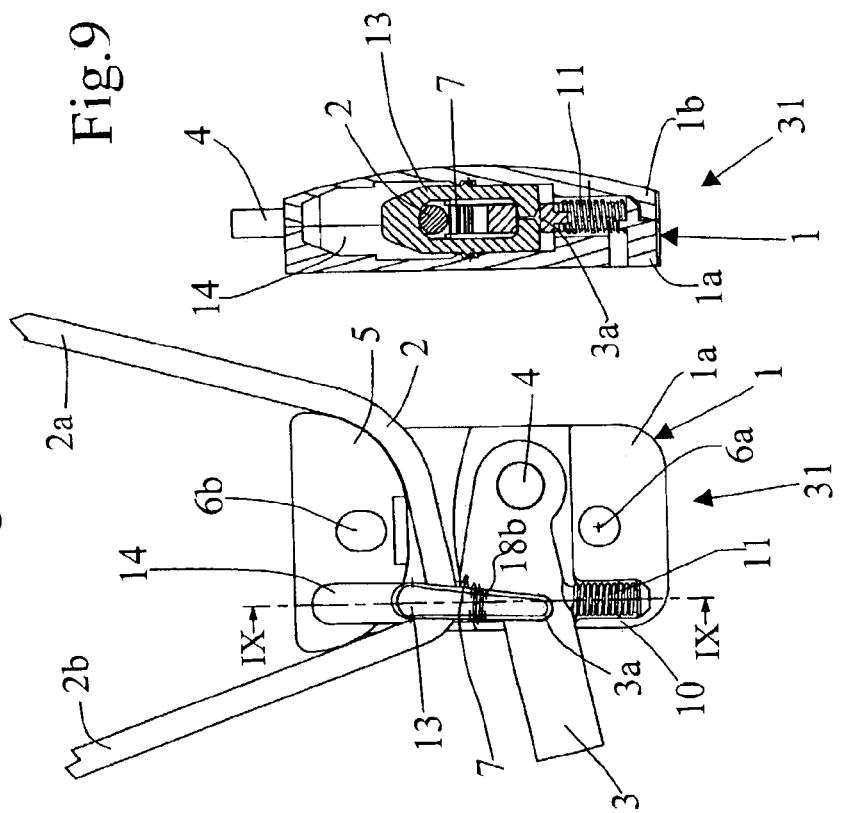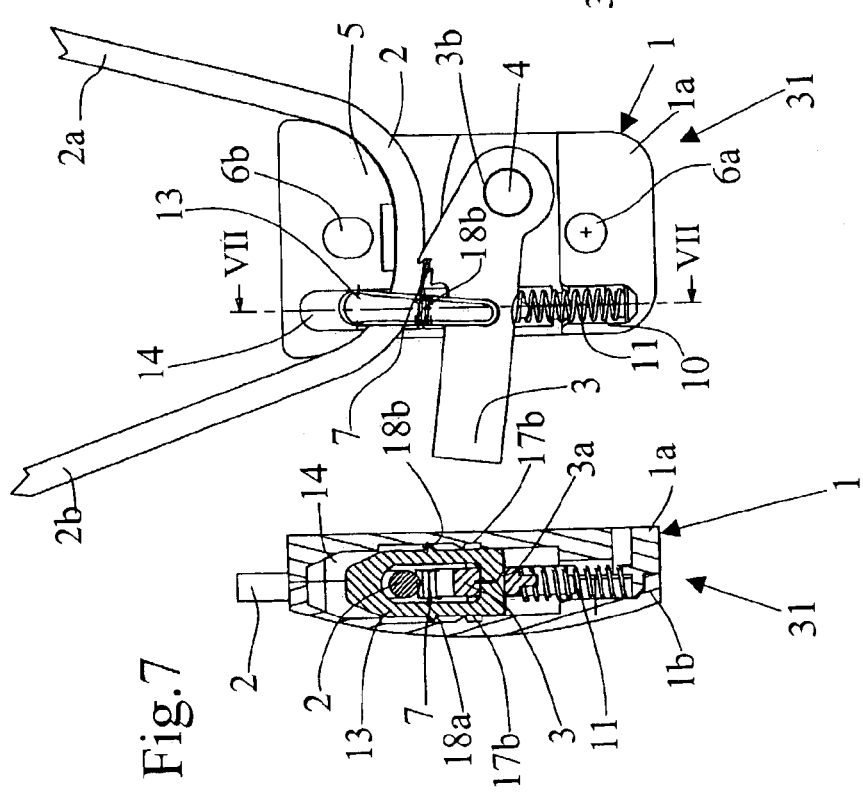

BRAKE DEVICE FOR A LACE

BACKGROUND OF THE INVENTION

The present invention relates to the field of boots and, in particular, to the field of sports boots. It relates to a brake device for a lace, of a boot, sliding in a base part linked to the boot, comprising a lever articulated on the base part, returned by an elastic means into a position of contact with the lace preventing the sliding of the lace in one direction by pressing.

Gliding sports involve conflicting stresses that affect the structure of boots. On the one hand, boots have to have rigid elements to allow the user to guide the gliding device precisely and to feel the response of the device to its stresses. On the other hand, they have to have flexible elements to guarantee comfort by distributing the contact pressure around the user's feet as uniformly as possible.

PRIOR ART

Application EP 1 066 767 discloses a boot having a rigid shell comprising a sole and on which a rigid collar is articulated. The shell has a notch on the top of the foot as far as the top of the instep. Semirigid elements are fixed on either side of this notch and overlap on the top of the foot to guarantee watertightness. These elements are produced, for example, from leather or from a synthetic material. This boot is closed and tightened using lever, tie, and buckle devices that interact with hooks. Such devices, when fixed on flexible elements, create zones of compression over users' feet.

To remedy this problem, it is possible to use a lace, as in application WO 96/03186. The snowboot described in that document has a hard shell produced in a single piece that surrounds the lower leg and heel of the rider, but has an opening on the top of the foot and soft parts covering this opening. The soft parts comprise eyelets in which a lace slides and, when tensioned, makes it possible to close and tighten the boot by the soft parts being brought closer together.

However, closure and tightening of a boot by a lace are impractical in the case of winter sports boots. Indeed, after having tensioned the lace, conventional use will be made of a knot in order to maintain this tension to guarantee closure of the boot. Such an operation may be particularly tedious when wearing winter sports gloves.

U.S. Pat. No. 1,242,774, the content of which is incorporated by reference, discloses a brake device for a lace that solves this problem. That document describes a device comprising a plate that has a hole enabling it to be linked rigidly to the upper of a boot, and that has a guide in which a lace is able to slide. At one of the ends of this guide, a fork-shaped lever is articulated about a pin orthogonal to the guide. This lever is returned into a position of contact with the end of the guide by a spring in order substantially to reduce the passage section for the lace at this end of the guide. In this way, when the lever is in contact with the end of the guide, the passage section for the lace is smaller than the cross section of the lace. Thus, when the lace is pulled in the direction that gives rise to the tightening of the boot, it slides freely in the guide, and when the lace is pulled in the opposite direction there is a pressing action by the lever and immobilization of the lace.

This brake device has a major drawback. When it is desired to remove a boot that has such a lace-brake device, it is necessary continuously to act on the lever in order to allow the displacement of the lace, enabling the boot to be opened. This manipulation, which is normally inconvenient, is made difficult by the wearing of winter sports gloves. Moreover, when the boot is offered for sale, particularly in a department store, a customer who is unfamiliar with the boot and wishes to try it on risks being unable to slip it on his or her foot because the lace is too tight, and therefore moving on to another product.

SUMMARY OF THE INVENTION

The object of the invention is to produce a lace-brake device that makes it possible to overcome this drawback. In particular, the invention proposes producing a brake device that allows the lace to slide in both directions after initial manipulation that can be carried Out without difficulty, even with only one hand, especially convenient when wearing winter sports gloves.

The lace-brake device according to the invention is noteworthy in that the lever has holding means enabling it to maintain a second, stable position allowing the sliding of the lace in both directions.

The device preferably comprises a means for releasing the return of the lever into its position preventing the sliding of the lace in one direction when a defined tensile force is exerted in a defined direction on the free end of the lace.

The means for triggering the return of the lever comprises a buckle articulated on the lever and inside which the lace slides.

The holding means comprise a stud made on the base part or lever, respectively, interacting with a hole made on the lever or base part, respectively.

The holding means may also comprise at least one notch made in the base part, interacting with at least one notch made on the buckle, in which the lace passes.

Preferably, the part of the lever for coming into contact with the lace has teeth that make it possible to increase the coefficient of friction between the lever and the lace.

According to variant embodiments of the device, the elastic means for returning the lever into its position of contact with the lace is a compression spring or a torsion spring mounted around the articulation pin of the lever on the base part.

A boot-closure device of the type with a lever, tie and buckle type may be fixed on the base part.

In this case, the closure device can be mounted slideably on the base part, and, when it is placed under tension, it may entrain the lever into its position preventing the sliding of the lace in one direction.

Hooks for interacting with a closure device of the type with a lever, tie and buckle in order to close the boot may be present on the base part.

When the lever of a tightening device for opening the boot is manipulated, means can make it possible to bring the lever into its stable position allowing the sliding of the lace in both directions.

BRIEF DESCRIPTION OF THE DRAWINGS

The appended drawing shows, by way of example, two embodiments of the brake device according to the invention.

FIG. 2 is a detailed view of a brake device in the "braked" position according to a first embodiment.

FIG. 3 is a sectional view on III—III of a brake device in the "braked" position according to a first embodiment.

FIG. 4 is a detailed view of a brake device in the "free" position according to a first embodiment.

FIG. 5 is a sectional view on V—V of a brake device in the "free" position according to first embodiment.

FIG. 6 is a detailed view of a brake device in the "braked" position according to a second embodiment.

FIG. 7 is a sectional view on VII—VII of a brake device in the "braked" position according to a second embodiment.

FIG. 8 is a detailed view of a brake device in the "free" position according to a second embodiment.

FIG. 9 is a sectional view on IX—IX of a brake device in the "free" position according to a second embodiment.

DESCRIPTION OF THE PREFERRED EMBODIMENTS

Figure 1:
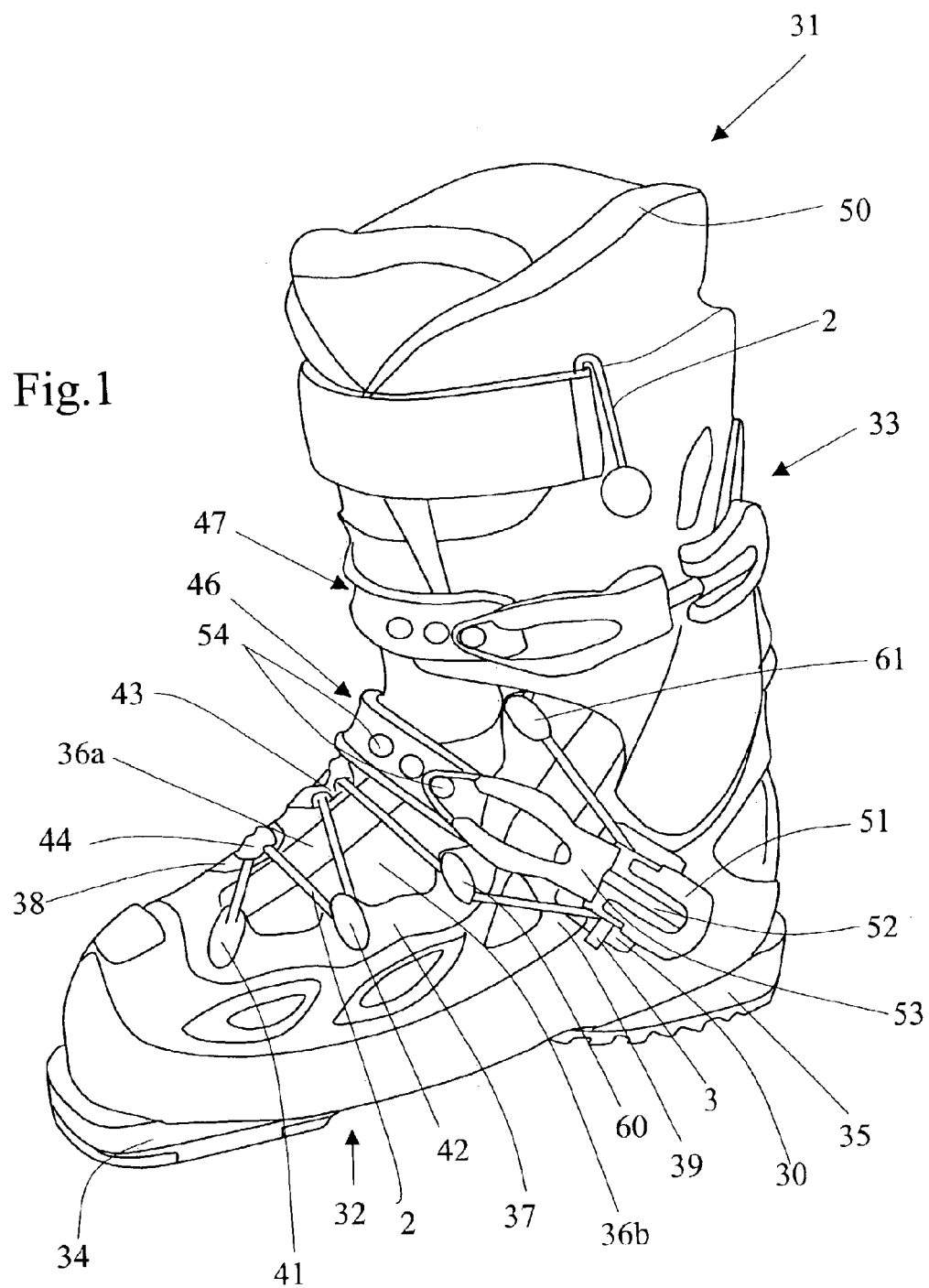
FIG. 1 is a perspective view of a ski boot equipped with a brake device according to the invention.

The ski boot 31 shown in FIG. 1 comprises a rigid shell 32 produced, for example, from injected polyurethane, a collar 33 also produced from a rigid material and articulated on the shell in the ankle region. The boot 31 contains a comfort liner 50. The shell 32 comprises a sole, the front 34 and rear 35 ends of which are shaped to allow the boot to be connected to a board for gliding (not shown) by means of bindings (not shown).

The shell 32 has an opening located over the top of the foot and extending as far as the top of the instep. This opening is closed by two flaps 36a and 36b produced from a flexible material and connected to the shell 32 on either side of the opening. The flap 36a covers over the flap 36b so as to make the boot 31 watertight. The boot 31 further comprises semirigid elements 37 and 38 also connected to the shell 32 on either side of the opening. The flexible flaps 36a and 36b, the semirigid elements 37 and 38, and the shell 32 are connected together by a joining piece 39 produced by means of an over-injection process.

The boot has closure and tightening means 46 and 47 of the lever, tie, and buckle type, interacting with hooks (shown diagrammatically). To supplement these tightening means, the boot 31 is provided on the top of the foot with a lace 2 sliding in the loops 41, 42, 43, 44, 60, and 61 of the semirigid elements 37 and 38. This lace 2 is fixed to the front end of the boot on the shell 32. When the lace is tensioned by a tensile force being exerted on the free end of the lace, the two elements 37 and 38 are brought closer together through the action of the lace 2 on them, and the boot 31 is tightened around the user's foot.

The tightening device comprises a lever 51 connected by articulations firstly to a base part 1 and secondly to a tie 52 integral with a buckle 53 interacting with hooks 54. In the base part 1 the device has a brake device 30 for the lace 2, making it possible to maintain the tension in the lace 2 when the boot has to be tightened around the user's foot, and allowing the lace 2 to slide in both directions when the user puts the boot on or takes it off.

The brake device 30 shown in FIGS. 2 through 5 consists principally of a base part 1 produced in two parts 1a and 1b, of a lever 3 articulated on the base part 1, of a guide 5 for the lace 2, and of a buckle 12 articulated on the lever 3, located outside the base part 1 and traversed by the lace 2.

The parts 1a and 1b of the base part 1 on which the latch 51 is articulated (not shown in these figures) have through-holes 6a and 6b enabling them to be connected to the boot 31 by means of rivets. The lower part 1a of the base part has a guide 5 for the lace 2 sliding in the base part 1.

At one of its ends, the lever 3 has a bore 3b allowing its articulation around a pin 4. The other end of the lever 3 can be manipulated by the user in order to change its position. A zone of the lever 3 has teeth 7 for coming into contact with the lace 2. The lever also comprises a hole 3a in which the buckle 12 is articulated.

A compression spring 11, housed in a bore 10 made in the base part 1, comes into contact with the lever 3 in order to return it into a stable, "braked" position, shown in FIGS. 2 and 3, in which the teeth 7 are in contact with the lace 2. The lower part of the base part has an elastic tab 19, at the end of which a stud 15 interacts with a hole 16 made in the lever 3 in order, by means of engagement of the stud 15 in the hole 16, to keep the lever 3 in a stable, "free" position, shown in FIGS. 4 and 5, in which the teeth 7 are not in contact with the lace 2. The moment created by the action of the spring 11 on the lever is less than the moment that has to be applied to the lever 3 for the stud 15 to emerge from the bore 16.

When the user wishes to slip his foot into the boot, he places the lever 3 in the "free" position in which it is not in contact with the lace 2. The user can then insert his foot in the boot by relaxing the tension in the lace 2. Once his foot has been placed inside the boot, he pulls on the free end 2b of the lace in order to tension the lace 2 and to tighten the boot around his foot. This force on the free end 2b brings the lever 3 into its "braked" position by means of the buckle 12. From this moment onwards, the lace 2 can slide in the base part only in one direction, generating an increase in the tension in the strand 2a, the end of which is connected to the shell 32 of the boot 31.

In fact, if a tension is exerted on the lace 2 having a tendency to cause it to slide in the opposite direction, the lace 2 exerts a force on the lever 3 that creates a moment about the pin 4 that tends to apply the lever 3 against the lace 2. Immobilization of the lace in this direction is produced by pressing.

When the user wishes to take his boot off, all he has to do is to manipulate the lever 3 in order to place it in its "free" position. He can then make the lace 2 slide inside the base part 1 in either direction and consequently detension the strand 2a of the lace 2 so as to be able to remove his foot from the boot 31.

A second embodiment of the brake device is shown in FIGS. 6 and 7 in the "braked" position, and in FIGS. 8 and 9 in the "free" position. It differs from the device described previously in that it has a buckle 13 that makes it possible to place the lever 3 in the "braked" position, inside the base part composed of the parts 1a and 1b. This buckle 13 is guided in a groove 14 made in the base part. It has two studs 18a and 18b for interacting with two notches 17a and 17b in order to keep the lever 3 in its "free" position. The passage from the "free" position to the "braked" position and vice versa is achieved by deformation of the parts 1a and 1b of the base part and of the buckle 13.

A variant (not shown) of the embodiments of the device according to the invention has a torsion spring to replace the spring 11 of the devices described.

The end of the free strand 2b of the lace 2 advantageously has an element, such as a tab or ball, that makes it possible to facilitate its gripping and the application of a tensile force.

In a variant (not shown) of the brake device, the boot has means that make it possible, when the latch 51 of one of the closure and tightening devices for opening the boot is manipulated, to place the lever 3, which is exposed and thus directly actuateable by the user, in its "free" position. These means are known in the state of the art and, in particular, from U.S. Pat. No. 5,136,794, the content of which is incorporated by reference. They may, for example, consist of a cable connected to one of the latches 51 of the tightening devices, and acting on the lever 3 of the brake device.

The boot may further have means that make it possible, when the latch 51 of one of the closure and tightening devices for closing the boot is manipulated, to place the lever 3 in its "braked" position. These means may, for example, comprise a closure device mourned slideably on the base part having the brake device. The displacement of the brake device during tightening of the boot is then used in order to place the lever 3 in its "braked" position.

Naturally, the invention may be applied to boots other than ski boots and may be applied, in particular, to snowboard boots.

Although illustrative embodiments of the invention have been shown and described, a wide range of modification, change and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed:

1. A brake device (30; 31) for a lace (2), of a boot (31), sliding in a base part (1) linked to the boot (31), comprising a lever (3) directly actuateable by a user, articulated on the base part (1), returned by an elastic means (11) into a position of contact with the lace (2) preventing the sliding of the lace (2) in one direction by a pressing action, wherein the lever (3) has holding means (15, 16; 17*a*, 17*b*, 18*a*, 18*b*) enabling the lever to maintain a second, stable position allowing the sliding of the lace (2) in both directions and wherein the device further comprises a means (12; 13) for releasing the return of the lever (3) into its position preventing the sliding of the lace (2) in one direction, said means (12; 13) for releasing being activated by an action consisting of exerting a defined tensile force in a defined direction on the free end (2*b*) the lace (2).

2. The brake device (30; 31) as claimed in claim 1, wherein the means (12; 13) for triggering the return of the lever (3) comprises a buckle (12; 13) articulated on the lever (3) and inside which the lace (2) slides.

3. The brake device (30; 31) as claimed in claim 1, wherein the part of the lever for coming into contact with the lace (2) has teeth (7) to increase the coefficient of friction between the lever (3) and the lace (2).

4. The brake device (30; 31) as claimed in claim 1, wherein the elastic means (11) for returning the lever (3) into its position of contact with the lace (2) is a compression spring (11).

5. The brake device as claimed in claim 1, wherein, when a latch (51) of a tightening device for opening the boot is manipulated, means bring the lever (3) into a stable position allowing the sliding of the lace (2) in both directions.

6. A brake device (30; 31) for a lace (2), of a boot (31), sliding in a base part (1) linked to the boot (31), comprising a lever (3) articulated on the base part (1), returned by an elastic means (11) into a position of contact with the lace (2) preventing the sliding of the lace (2) in one direction by a pressing action, wherein the lever (3) has holding means (15, 16; 17*a*, 17*b*, 18*a*, 18*b*) enabling the lever to maintain a second, stable position allowing the sliding of the lace (2) in both directions wherein the holding means (15, 16) comprise a stud (15) made on the base part (1) or lever (3), respectively, interacting with a housing (16) made on the lever (3) or base part (1), respectively.

7. A brake device (30; 31) for a lace (2), of a boot (31), sliding in a base part (1) linked to the boot (31), comprising a lever (3) articulated on the base part (1), returned by an elastic means (11) into a position of contact with the lace (2) preventing the sliding of the lace (2) in one direction by a pressing action wherein the lever (3) has holding means (15, 16; 17*a*, 17*b*, 18*a*, 18*b*) enabling the lever to maintain a second, stable position allowing the sliding of the lace (2) in both directions wherein the holding means (17*a*, 17*b*, 18*a*, 18*b*) comprise at least one notch (17*a*, 17*b*) made in the base part (1), interacting with at least one notch (18*a*, 18*b*) made on a buckle (13), in which the lace (2) passes.

8. A brake device (30; 31) for a lace (2), of a boot (31), sliding in a base part (1) linked to the boot (31), comprising a lever (3) articulated on the base part (1), returned by an elastic means (11) into a position of contact with the lace (2) preventing the sliding of the lace (2) in one direction by a pressing action, wherein the lever (3) has holding means (15, 16; 17*a*, 17*b*, 18*a*, 18*b*) enabling the lever to maintain a second, stable position allowing the sliding of the lace (2) in both directions wherein the elastic means for returning the lever (3) into its position of contact with the lace (2) is a torsion spring mounted around an articulation pin (4) of the lever (3) on the base part (1).

9. A brake device (30; 31) for a lace (2), of a boot (31), sliding in a base part (1) linked to the boot (31), comprising a lever (3) articulated on the base part (1), returned by an elastic means (11) into a position of contact with the lace (2) preventing the sliding of the lace (2) in one direction by a pressing action, wherein the lever (3) has holding means (15, 16; 17*a*, 17*b*, 18*a*, 18*b*) enabling the lever to maintain a second, stable position allowing the sliding of the lace (2) in both directions wherein a boot-closure device of the type with a lever (51), tie (52), and buckle (53) is fixed on the base part (1).

10. The brake device as claimed in claim 9, wherein the closure device is mounted slideably on the base part (1), and wherein, when the lace (2) is placed under tension in another direction, the lace entrains the buckle (53) and thus the lever (3) into its position preventing the sliding of the lace (2) in one loosening direction.

11. A brake device (30; 31) for a lace (2), of a boot (31), sliding in a base part (1) linked to the boot (31), comprising a lever (3) articulated on the base part (1), returned by an elastic means (11) into a position of contact with the lace (2) preventing the sliding of the lace (2) in one direction by a pressing action, wherein the lever (3) has holding means (15, 16; 17*a*, 17*b*, 18*a*, 18*b*) enabling the lever to maintain a second, stable position allowing the sliding of the lace (2) in both directions wherein the base part has hooks for interacting with a closure device of the type with a lever, tie and buckle in order to close the boot.

12. A brake device (30; 31) for a lace (2), of a boot (31), sliding in a base part (1) linked to the boot (31), comprising a lever (3) directly actuateable by a user, articulated on the base part (1), returned by an elastic means (11) into a position of contact with the lace (2) preventing the sliding of the lace (2) in one direction by a pressing action, wherein the lever (3) has holding means (15, 16; 17*a*, 17*b*, 18*a*, 18*b*) enabling the lever to maintain a second, stable position allowing the sliding of the lace (2) in both directions.

13. The brake device (30; 31) as claimed in claim 12, wherein the means (12; 13) for triggering the return of the lever (3) comprises a buckle (12; 13) articulated on the lever (3) and inside which the lace (2) slides.

* * * * *